E. GRUENFELDT.

METHOD OF REGULATING SOUND BOX REPRODUCTION.

APPLICATION FILED JAN. 17, 1921.

Reissued May 31, 1921. 15,114.

Inventor
Emil Gruenfeldt

By Chas. E. Brock
Attys.

UNITED STATES PATENT OFFICE.

EMIL GRUENFELDT, OF CLEVELAND, OHIO.

METHOD OF REGULATING SOUND-BOX REPRODUCTION.

15,114. Specification of Reissued Letters Patent. Reissued May 31, 1921.

Original No. 1,170,530, dated February 8, 1916, Serial No. 1,239, filed January 8, 1915. Application for reissue filed January 17, 1921. Serial No. 438,007.

*To all whom it may concern:*

Be it known that I, EMIL GRUENFELDT, a citizen of the United States, residing at Cleveland, in the county of Cuyahoga and State of Ohio, have invented certain new and useful Improvements in and Relating to Methods of Regulating Sound-Box Reproduction, of which the following is a specification.

This invention relates to an improved method for regulating the operation of a sound box or reproducer for a phonograph or like instrument.

The object of my invention is to provide a method whereby the operator, merely by engaging resiliently the needle arm of a sound box with a regulating mass and moving the same to and fro therealong between the points of connection of said needle arm with the diaphragm and the sound box frame, is able to yieldably regulate the essential coaction of the parts to obtain the reproductive effect desired.

For the purpose of illustration I have, in the accompanying drawing, shown and herein described examples of regulators for sound boxes embodying my invention.

Figure 1:
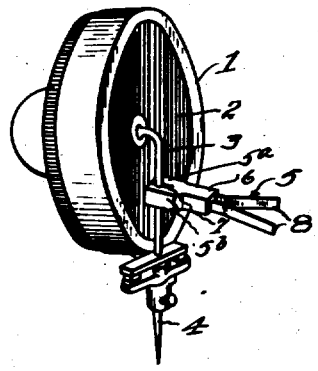
Figure 2:
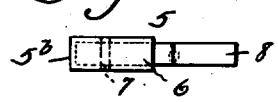
Figure 3:
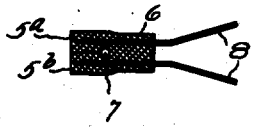
Figure 4:
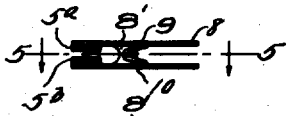
Figure 5:
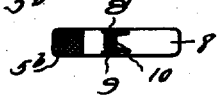

Figure 1 is a perspective view of a sound box for a phonograph or like instrument to which is applied a regulator embodying my invention. Fig. 2 is a side elevation of the regulator. Fig. 3 is a longitudinal sectional view of the regulator. Fig. 4 is a longitudinal vertical section illustrating a regulator embodying my invention but of slightly different form. Fig. 5 is a view on the line 5—5 of Fig. 4.

In the drawings, 1 represents, as an entirety, a sound box or reproducer of standard construction, 2 a diaphragm thereof, 3 a needle arm and 4 the needle.

5 indicates as an entirety one of my improved regulators. It is adapted to be fitted to the needle arm intermediate the diaphragm and the needle socket of the needle arm and to be adjusted therealong to give the desired effect to the sound reproduction. Preferably my regulator consists of a pair of non-metallic resilient yieldable jaws $5^a$, $5^b$, which are resiliently pressed toward each other in any suitable manner, the jaws themselves being adapted to engage the needle arm. In Figs. 1, 2 and 3, the jaws $5^a$, $5^b$, are formed integral with a rubber head 6 which may be molded or formed in any suitable manner. The rubber piece 6 is formed with a hole 7 through it at the end of the line separating the inner walls of the jaws $5^a$, $5^b$, so as to preclude tearing apart of the piece 6 along the line of the faces of the jaws $5^a$, $5^b$. In fact, these faces may be formed by making a cut through the piece 6 from the hole 7 to the end thereof, and it is the yieldable or resilient property of the mass as a whole and of these faces in particular that enables the proper contact to be had between the regulating mass and the needle bar independent of the pressure communicated by the jaws to the needle bar.

8, 8 are operating arms for the jaws $5^a$, $5^b$. They may be incorporated in the piece 6 when it is molded or may be inserted and held in position in any suitable manner and may be of any suitable material.

In Figs. 4 and 5, a modified form of construction is shown in which the arms 8 have lateral extensions 8′ pivotally connected together by a pivot 9. 10 is a spring surrounding the pivot 9 and having its ends bearing against said arms 8 respectively. Each of the jaws $5^a$, $5^b$, of any suitable sound deadening or resilient or yieldable material is suitably secured to one end of one of the arms 8 respectively, the spring 10 serving normally to press the jaws $5^a$, $5^b$ in engagement with each other.

In operation one of my improved regulators is placed upon the needle arm of the sound box or producer by separating the jaws $5^a$, $5^b$ and the regulator is moved up and down along the needle arm from the periphery of the diaphragm to its center in order to regulate the sound reproduction as desired. The nearer to the center of the diaphragm which the resilient jaws engage the needle arm, the softer will be the results produced while the farther from the center of the diaphragm the regulator is adjusted the louder will be the effective reproduction.

It will be noted that the regulator is of simple, cheap and durable construction, and that it may be readily and quickly fitted to the needle arm and adjusted therealong.

It will be understood that the weight of the regulator as an entirety is a factor in the obtaining of the desired coöperative results between the regulator, needle arm and diaphragm, and that this weight may be proportioned accordingly to get the desired results. The resilient or yieldable nature of the jaws $5^a$, $5^b$, is important in respect to the muffling of the sound reproduced and the avoidance of mechanical noises between the regulator and the needle arm without the necessity of undue pressure, which would undoubtedly serve largely to defeat the purposes of the device.

To those skilled in the art many alterations in construction and widely differing embodiments and applications of my invention will suggest themselves, without departing from the spirit and scope thereof. My disclosures and the description herein are purely illustrative and are not intended to be in any sense limiting.

Having thus described my invention what I claim is:

1. The method of regulating the reproduction of sound from a sound box, which consists in adjustably engaging with the needle arm of said sound box, between its point of connection with the diaphragm and its point of connection with said sound box, a mass of yieldable material and supporting said regualting mass solely by said needle arm and effecting the reproduction desired by utilizing the weight and yieldability of said mass and moving the same to and fro along said needle arm.

2. The method of regulating the reproduction of sound from a sound box, which consists in adjustably engaging with the needle arm of a sound box, between its point of connection with the diaphragm and its point of connection with the sound box, a regulating mass of sound deadening material and supporting said regulating mass solely by said needle arm and effecting the reproduction desired by utilizing the weight of said mass and moving the same to and fro along the needle arm.

EMIL GRUENFELDT.